(12) United States Patent
Biller et al.

(10) Patent No.: US 9,205,821 B2
(45) Date of Patent: Dec. 8, 2015

(54) BRAKE SYSTEM FOR MOTOR VEHICLES

(75) Inventors: Harald Biller, Eschborn (DE); Peter Stauder, Mainz (DE); Marco Beisier, Bad Schwalbach (DE); Hans-Jörg Feigel, Rosbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 116 days.

(21) Appl. No.: 14/110,658

(22) PCT Filed: Apr. 16, 2012

(86) PCT No.: PCT/EP2012/056868
§ 371 (c)(1),
(2), (4) Date: Oct. 8, 2013

(87) PCT Pub. No.: WO2012/143311
PCT Pub. Date: Oct. 26, 2012

(65) Prior Publication Data
US 2014/0028084 A1    Jan. 30, 2014

(30) Foreign Application Priority Data

Apr. 19, 2011  (DE) .......................... 10 2011 007 655
Apr. 19, 2011  (DE) .......................... 10 2011 007 656
Apr. 11, 2012  (DE) .......................... 10 2012 205 860

(51) Int. Cl.
   *B60T 13/68*    (2006.01)
   *B60T 13/58*    (2006.01)
   *B60T 8/40*     (2006.01)

(52) U.S. Cl.
   CPC ............... *B60T 13/58* (2013.01); *B60T 8/4081* (2013.01); *B60T 13/686* (2013.01)

(58) Field of Classification Search
   CPC ..... B60T 13/142; B60T 13/588; B60T 13/66; B60T 13/686; B60T 8/4081
   USPC ............... 303/11, 113.3, 113.4, 114.1, 114.2, 303/115.2, 116.1, 116.2
   See application file for complete search history.

(56) References Cited

U.S. PATENT DOCUMENTS 6,446,435 B1 *  9/2002  Willmann et al. ............... 60/533
6,899,403 B2 *  5/2005  Isono et al. ..................... 303/11

(Continued)

FOREIGN PATENT DOCUMENTS

DE    42 13 740 A1   10/1993
DE    195 38 794 A1   4/1997

(Continued)

OTHER PUBLICATIONS

German Examination Report—Feb. 19, 2013.

(Continued)

*Primary Examiner* — Thomas Irvin
(74) *Attorney, Agent, or Firm* — Brinks Gilson & Lione

(57) ABSTRACT

A motor vehicle brake system operable in a brake-by-wire and fallback modes. The system includes a brake pedal (1), a master cylinder (2), a reservoir (4), a travel simulator (3), an electrically controllable pressure source (5), isolation valves (23*a*, 23*b*) pumps (32*a*, 32*b*) and a low-pressure accumulator (14*a*, 14*b*), an inlet valve (6*a*-6*d*) and an outlet valve (7*a*-7*d*) for each wheel brake (8, 9, 10, 11), valves (34*a*, 34*b;* 134*a*, 134*b*) connected to the pumps (32*a*, 32*b*), and a control and regulation unit (110, 210). A valve arrangement (23*a*, 23*b*) establishes for each brake circuit (I, II) a connection from the pressure chamber (17, 18) of the master cylinder (2) to the modulator admission pressure line (13*a*, 13*b;* 113*a*, 113*b*) and disconnects the connection when unenergized, the valve arrangement (23*a*, 23*b*) preventing the pressure source (5) from being subjected to pressure from the pressure chambers (17, 18).

15 Claims, 2 Drawing Sheets

(56) References Cited

U.S. PATENT DOCUMENTS

| | | | |
|---|---|---|---|
| 7,630,815 B2* | 12/2009 | Tanaka et al. | 701/70 |
| 7,651,176 B2* | 1/2010 | Inoue et al. | 303/114.1 |
| 8,224,545 B2* | 7/2012 | Tanaka et al. | 701/70 |
| 8,333,442 B2* | 12/2012 | Hatano et al. | 303/115.1 |
| 8,447,486 B2* | 5/2013 | Nakata et al. | 701/70 |
| 8,517,476 B2* | 8/2013 | Okano et al. | 303/167 |
| 8,840,199 B2* | 9/2014 | Hatano et al. | 303/115.2 |
| 8,911,030 B2* | 12/2014 | Ohnishi et al. | 303/115.1 |
| 8,926,027 B2* | 1/2015 | Shimada | 303/10 |
| 2008/0223670 A1 | 9/2008 | Toyohira et al. | |
| 2009/0179483 A1* | 7/2009 | Hatano | 303/3 |
| 2009/0199555 A1* | 8/2009 | Hatano | 60/545 |
| 2009/0229931 A1* | 9/2009 | Baumann et al. | 188/72.2 |
| 2010/0001577 A1* | 1/2010 | Hatano | 303/3 |
| 2011/0148185 A1* | 6/2011 | Okano et al. | 303/6.01 |
| 2011/0241419 A1* | 10/2011 | Ohkubo et al. | 303/9.62 |
| 2012/0112525 A1* | 5/2012 | Shimada | 303/10 |
| 2012/0119566 A1* | 5/2012 | Ohnishi et al. | 303/20 |
| 2012/0169112 A1* | 7/2012 | Jungbecker et al. | 303/9.75 |
| 2012/0193975 A1* | 8/2012 | Ishii | 303/14 |
| 2012/0326491 A1* | 12/2012 | Gotoh et al. | 303/6.01 |
| 2013/0147259 A1* | 6/2013 | Linkenbach et al. | 303/14 |
| 2014/0008965 A1* | 1/2014 | Ito et al. | 303/3 |
| 2014/0008966 A1* | 1/2014 | Hotani et al. | 303/14 |
| 2014/0028084 A1* | 1/2014 | Biller et al. | 303/9.62 |
| 2014/0110997 A1* | 4/2014 | Biller et al. | 303/9.62 |
| 2014/0152085 A1* | 6/2014 | Biller et al. | 303/10 |
| 2014/0203626 A1* | 7/2014 | Biller et al. | 303/10 |
| 2014/0225425 A1* | 8/2014 | Drumm et al. | 303/9.75 |
| 2015/0020520 A1* | 1/2015 | Feigel et al. | 60/534 |
| 2015/0021978 A1* | 1/2015 | Feigel | 303/15 |
| 2015/0025767 A1* | 1/2015 | Feigel | 701/70 |
| 2015/0035353 A1* | 2/2015 | Drumm | 303/15 |
| 2015/0061364 A1* | 3/2015 | Murayama et al. | 303/15 |
| 2015/0061854 A1* | 3/2015 | Drumm et al. | 340/453 |
| 2015/0166024 A1* | 6/2015 | Biller | 701/93 |

FOREIGN PATENT DOCUMENTS

| | | |
|---|---|---|
| DE | 195 43 582 A1 | 6/1997 |
| DE | 10 2008 010 528 A1 | 9/2008 |
| DE | 10 2008 015 241 A1 | 9/2008 |
| DE | 10 2009 031 392 A1 | 1/2010 |
| EP | 0 280 740 | 3/1988 |
| EP | 0 485 367 A2 | 6/1989 |
| EP | 1 334 893 A2 | 8/2003 |
| EP | 1 481 863 A1 | 12/2004 |
| EP | 2 520 473 A1 | 11/2012 |
| JP | 2008-100588 | 5/2008 |
| JP | 2010-52504 | 3/2010 |
| WO | WO 91/05686 | 5/1991 |
| WO | WO 00/34097 | 6/2000 |
| WO | WO 2011/029812 A1 | 3/2011 |

OTHER PUBLICATIONS

PCT International Search Report—Jul. 25, 2012.
German Examination Report—Feb. 15, 2013.
PCT International Search Report—Jul. 20, 2012.

* cited by examiner

BRAKE SYSTEM FOR MOTOR VEHICLES

CROSS REFERENCE TO RELATED APPLICATIONS

This application claims priority to German Patent Application Nos. 102011 007 656.6, filed Apr. 19, 2011, 10 2011 007 655.7, filed Apr. 19, 2011, 10 2012 205 860.5, filed Apr. 11, 2012, and PCT/EP2012/056868, filed Apr. 16, 2012.

FIELD OF THE INVENTION

The present invention relates to a brake system for motor vehicles which in a brake-by-wire operating mode can be activated both by the vehicle driver and independently of the vehicle driver, and is operated preferably in the brake-by-wire operating mode and can be operated in at least one fallback operating mode in which only operation by the vehicle driver is possible.

BACKGROUND AND INTRODUCTORY DESCRIPTION

A brake system in accordance with this invention includes:
a) a brake pedal for actuating a brake master cylinder having a housing and two pistons which are arranged one behind the other and delimit pressure chambers arranged in the housing, to which pressure chambers two brake circuits are connected, an actuating force (pedal force) being exerted on the pistons upon actuation of the brake system by the vehicle driver and the pistons being positioned in a starting position by return springs when the brake pedal is not actuated,
b) a pressure medium reservoir which is under atmospheric pressure and has chambers associated with the pressure chambers,
c) a travel detection device which detects the actuation travel of the brake pedal or of a piston connected to the brake pedal,
d) a travel simulator having a simulator release valve, which travel simulator communicates the accustomed brake pedal feel (haptic) to the vehicle driver in the brake-by-wire operating mode, being connected hydraulically via the simulator release valve to one of the pressure chambers and this connection being disconnected in the fallback operating mode,
e) an electrically controllable pressure source which delivers a brake system pressure,
f) isolation valves for isolating the pressure chambers from the brake circuits,
g) pumps which are driven by means of an electric motor and are associated with the brake circuits, together with low-pressure hydraulic accumulators,
h) an inlet valve and an outlet valve for each wheel brake for setting wheel-individual brake pressures which are derived from modulator admission pressures associated with the brake circuits, the inlet valves transmitting the modulator admission pressure to the wheel brakes in the unactivated state and limiting or preventing a build-up of wheel brake pressure in the activated state and the outlet valves preventing an outflow of pressure medium from the wheel brakes into a low-pressure accumulator in the unactivated state and permitting and controlling the outflow in the activated state, the inlet valves being closed, so that a reduction of wheel brake pressure takes place,
i) electrically operable, currentlessly open valves connected to the outlet ports of the pumps, and
j) at least one electronic control and regulation unit.

A brake system of the above-referenced general type is known, for example, from DE 10 2009 031 392 A1. In the known brake system, two pressure chambers of a brake master cylinder are connected to two respective pressure chambers of a dual-circuit electrically controllable electrohydraulic pressure source.

The two pressure chambers of the electrohydraulic pressure source are connected via an ABS system to four wheel cylinders of the wheel brakes. The wheel cylinders are actuated by brake fluid pressure which, in a malfunction situation in which the electrically controllable pressure source is inoperative, is generated by the brake master cylinder. The known brake system includes two separate, independent fluid pressure lines: one line extends from one of the pressure chambers of the brake master cylinder to the wheel cylinders via one of the pressure chambers of the controllable pressure source, and the other line extends from the other pressure chamber of the brake master cylinder to the second pair of wheel cylinders via the second pressure chamber of the controllable pressure source. A minimum required braking force is therefore ensured even if a malfunction occurs in one of the two fluid pressure lines.

It is disadvantageous that, in an operating mode without actuation of the electrically controllable pressure source, not just a minimum braking force but practically no braking force is actually available if leakage occurs in one of the two brake circuits. As is apparent from each of FIGS. 1 to 6 of the aforementioned document, the two pressure chambers of the electrically controllable pressure source are separated from one another by a floating piston which is freely displaceable in a cylinder. The pressure medium volume displaced from the master cylinder into the cylinder in the intact brake circuit therefore causes merely a displacement of the floating piston but not a build-up of wheel brake pressure.

Starting from this state of the art, it is the object of the present invention to develop a brake system which in this operating mode is able to build up pressure in the remaining brake circuit in the event of failure of one brake circuit.

This object is achieved according to the present invention by a brake system as described herein.

BRIEF DESCRIPTION OF THE DRAWINGS

The present invention is explained in more detail in the following description in conjunction with the appended schematic drawing and with reference to two exemplary embodiments.

DETAILED DESCRIPTION

Figure 1:
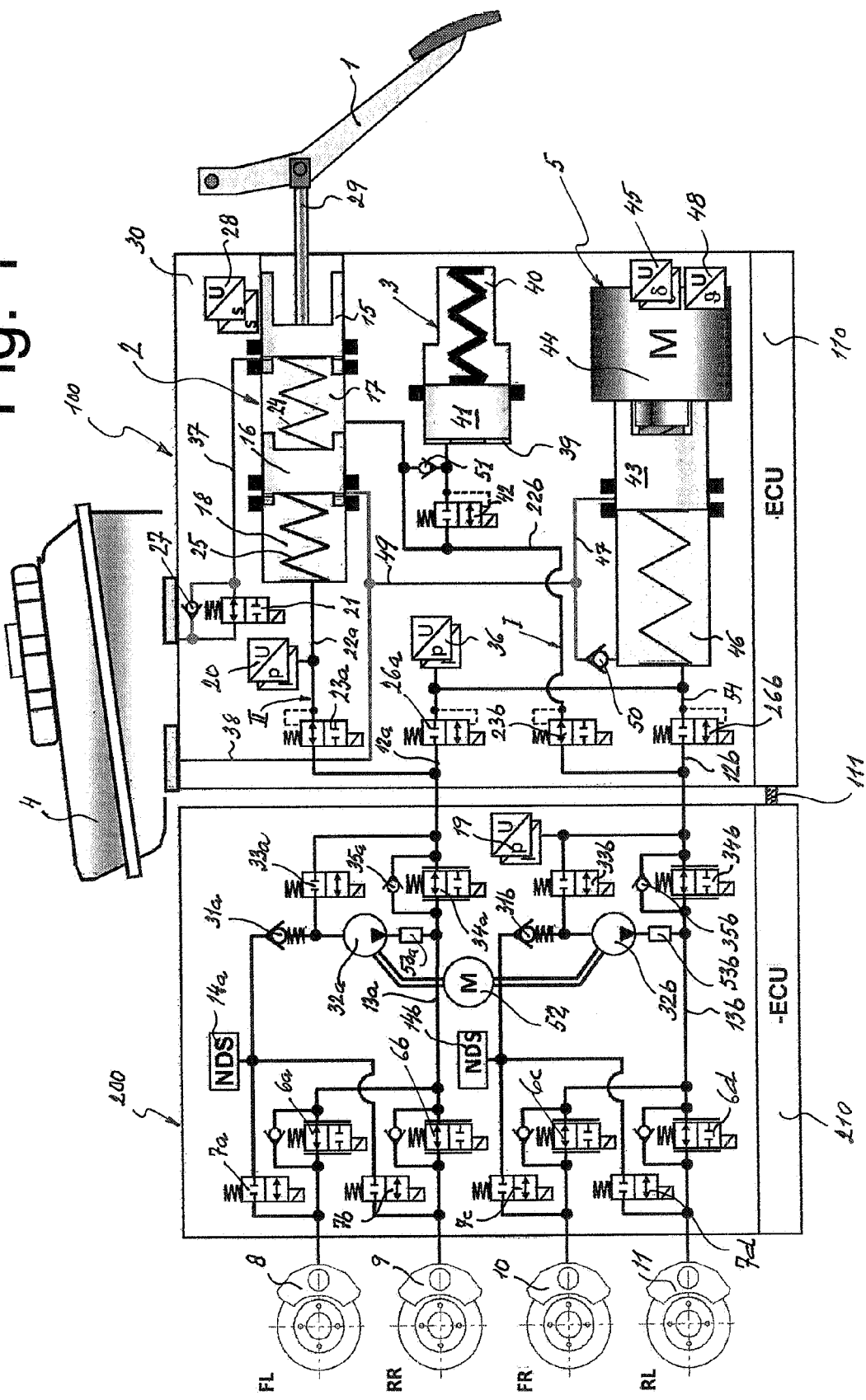
FIG. 1 of the drawing shows a hydraulic circuit diagram of the first exemplary embodiment of the brake system according to the invention.

The brake system represented in the drawing consists essentially of a hydraulic tandem master cylinder 2 which can be actuated by means of an actuating or brake pedal 1, a travel simulator 3 which cooperates with the tandem master cylinder 2, a pressure medium reservoir 4 associated with the tandem master cylinder 2, an electrically controllable pressure source 5, and electrically controllable pressure modulation inlet and outlet valves 6a-6d, 7a-7d which are connected together hydraulically in pairs via center connections to which wheel brakes 8, 9, 10, 11 of a motor vehicle (not shown) are connected. The inlet connections of the inlet valves 6a-6d are supplied in pairs with two pressures, referred to as modulator admission pressures, by means of modulator admission pressure lines 13a, 13b, while the outlet connections of the outlet valves 7a-7d are connected in pairs to a respective low-pressure hydraulic accumulator 14a, 14b in each case. A preferably redundantly implemented pressure sensor 19 is provided to detect the pressure prevailing in the brake circuit I.

As is also apparent from the drawing, the low-pressure accumulators 14a, 14b are each connected, via non-return (check) valves 31a, 31b which close in the direction of the low-pressure accumulators 14a, 14b, to respective hydraulic pumps 32a, 32b. Both pumps 32a, 32b are driven by means of a common electric motor denoted by reference 52. A respective electromagnetically actuable, currentlessly closed (normally closed—NC) 2/2-way valve 33a, 33b is connected in each case between the brake circuit pressure line 12a, 12b and the suction connection of the pump 32a, 32b, making possible a valve-controlled pressure medium supply to the pump. The pressure connections of the pumps 32a, 32b are connected via hydraulic pulsation damping elements 53a, 53b to the modulator admission pressure lines 13a, 13b. This makes it possible to increase the two modulator admission pressures by means of the pumps 32a, 32b. The aforementioned components 6a-6d, 7a-7d, 13a, 13b, 14a, 14b, (31-33)a, (31-33)b are combined to form a first electrohydraulic module denoted by reference 200. An electronic control and regulation unit 210 serves to activate all the electrically operable components of the first electrohydraulic module 200.

As is shown in the drawing, the tandem master cylinder 2 of the brake system according to the invention has in a housing 30 two hydraulic pistons 15, 16 arranged one behind the other which delimit hydraulic chambers or pressure chambers 17, 18. The pressure chambers 17, 18 are connected on the one hand via radial bores formed in the pistons 15, 16 and corresponding pressure compensation lines 37, 38 to the pressure medium reservoir 4, said bores being blockable by relative movement of the pistons 17, 18 in the housing 30, and on the other by means of hydraulic lines 22a, 22b to the aforementioned brake circuit pressure lines 12a, 12b, via which the first electrohydraulic module 200 is connected to the tandem master cylinder 2. The hydraulic lines 22a, 22b and the brake circuit pressure lines 12a, 12b form part of a respective brake circuit in each case, denoted by references I and II. A parallel connection of a currentlessly open (normally open—NO) diagnostic valve 21 with a non-return (check) valve 27, which closes towards the pressure medium reservoir 4, is contained in the pressure compensation line 37. Isolation valves 23a, 23b are connected between the hydraulic lines 22a, 22b and the brake circuit pressure lines 12a, 12b and are in the form of electrically operated, preferably currentlessly open (normally open—NO) 2/2-way valves which enable the brake master cylinder pressure chambers 17, 18 to be isolated from the brake circuit pressure lines 12a, 12b. A pressure sensor 20 connected to the pressure chamber 18 or to the hydraulic line 22a detects the pressure built up in the pressure chamber 18 by displacement of the second piston 16. In addition, the pressure chambers 17, 18 accommodate returned springs 24, 25 which position the pistons 15, 16 in a starting position when the brake master cylinder is not actuated. A push rod 29 couples the swiveling movement of the brake pedal 1 resulting from a pedal actuation to the translational movement of the first (master cylinder) piston 15, the actuation travel of which is detected by a preferably redundantly implemented travel sensor 28. The corresponding piston travel signal is thus a measure for the brake pedal actuation angle. It represents a braking request of a vehicle driver.

It can also be seen from the graphic representation of the brake system according to the invention that the aforementioned travel simulator 3 is coupled hydraulically to the brake master cylinder 2 and, in the example, is configured as an independent assembly consisting substantially of a simulator chamber 39, a simulator spring chamber 40 and a simulator piston 41 separating the two chambers 39, 40 from one another. Here, the simulator chamber 39 is connectable by means of an electrically operable simulator release valve 42 via the hydraulic connection 22b to the first pressure chamber 17 of the tandem master cylinder 2. Upon application of a pedal force and with the simulator release valve 42 activated, pressure medium flows from the master cylinder pressure chamber 17 into the simulator chamber 39. The pedal feel generated in this case depends on the counter-pressure built up in the travel simulator and on the throttling characteristics of the activated simulator release valve 42. A further non-return (check) valve 51 arranged hydraulically in antiparallel with the simulator release valve 42 enables a largely unimpeded return flow of pressure medium from the simulator chamber 39 to the master cylinder pressure chamber 17 independently of the switching state of the simulator release valve 42 and independently of the throttling effect thereof. The resulting undamped release of the brake pedal is felt to be agreeable. Without this function an impression of so-called "sticking" brakes could arise.

Finally, it is apparent from the drawing that the electrically controllable pressure source 5 is in the form of a hydraulic cylinder-piston arrangement or a single-circuit electrohydraulic actuator, the piston 43 of which is operable by a schematically indicated electric motor 44 via an interposed rotation-translation gear, also represented schematically. A rotor position sensor, indicated only schematically, which serves to detect the rotor position of the electric motor 44 is denoted by reference 45. In addition, a temperature sensor 48 for detecting the temperature of the motor winding may be used. The piston 43 delimits a pressure chamber 46. An elastomeric sealing ring which is arranged in a groove in the piston or, as illustrated—if a plunger piston is used—in a groove in the pressure chamber wall, serves to seal the gap between piston and wall. The plunger principle allows a lubrication connections 47 connected to the pressure medium reservoir 4 to be provided. The two functions of the sealing package: sealing against a pressure gradient and sealing of pressure medium to air, are thereby distributed to two elastomeric sealing rings, so that both can be optimized for their particular function. A pressure medium connection 49, which is connected directly to the pressure medium reservoir 4, or indirectly via the aforementioned pressure compensation line 38, leads to the pressure chamber 46 via a non-return (check) valve 50 which opens in this flow direction. A system pressure line 54 which transmits the system pressure delivered by the electrically controllable pressure source 5 is connected to the pressure chamber 46 of the electrically controllable pressure source 5. A preferably redundantly implemented pressure sensor 36 which detects the system pressure is connected to the system pressure line 54, together with two electrically operable sequence valves 26a, 26b. The aforementioned components 2, 3, 5, 20, 22a, 22b, 23a, 23b, 26a, 26b, 27, 28, 29, 30, 36, 37, 38, 42, 45, 47, 48, 49, 50, 51 are combined to form a second electrohydraulic module denoted by reference 100. An electronic control and regulation unit 110, which exchanges data with the aforementioned electronic control and regulation unit 210 by means of a communication line 111, serves to activate all the electrically actuable components of the second module 100.

In FIG. 1 the sequence valves 26a, 26b already mentioned, which are connected on one side to the system pressure line 54, are connected on the other to the brake circuit pressure lines 12a, 12b. Accordingly, upon activation of the sequence valves 26a, 26b the system pressure is switched to the brake circuit pressure lines 12a, 12b. This activation takes place whenever the vehicle driver activates the brake system in the brake-by-wire operating mode, and simultaneously or with a very small time offset after activation of the isolation valves 23a, 23b and of the simulator release valve 42. The master cylinder 2 and the pedal 1 are therefore uncoupled from the brake circuit pressures in the brake-by-wire operating mode, and connected to the simulator 3.

As is further apparent from FIG. 1, the first 200 and second electrohydraulic module 100 are connected to one another hydraulically via the two brake circuit pressure lines 12a, 12b, to which the system pressure is switched in the second module 100 in the brake-by-wire operating mode. Within the first module 200 the brake circuit pressure lines 12a, 12b are connected to the modulator admission pressure lines 13a, 13b in each case via a respective currentlessly open (normally open—NO) 2/2-way valve 34a, 34b, controllable by analog means, to each of which a respective non-return (check) valve 35a, 35b opening in the flow direction to the wheel brakes 8-11 is connected in parallel. These valves are activated if, for example, modulator admission pressures higher than the brake circuit pressures are generated with the aid of the pumps 32a, 32b for a corrective braking intervention for dynamic stability control. The pressure medium volume required for such a pressure build-up by means of the pumps 32a, 32b is supplied to the pumps 32a, 32b via pressure medium supply valves 33a, 33b connected between the brake circuit pressure lines 12a, 12b and the suction-side connections of the pumps 32a, 32b, which pressure medium supply valves 33a, 33b are activated electrically for this purpose and are otherwise—that is, in the currentless state—closed.

In FIG. 1 the outlet connections of the isolation valves 23a, 23b are connected inside the second module 100 to those of the sequence valves 26a, 26b, permitting the hydraulic connection, already mentioned, of the two modules 100, 200 by only two hydraulic flow paths, which are formed by the brake circuit pressure lines 12a, 12b mentioned in the preceding text.

Figure 2:
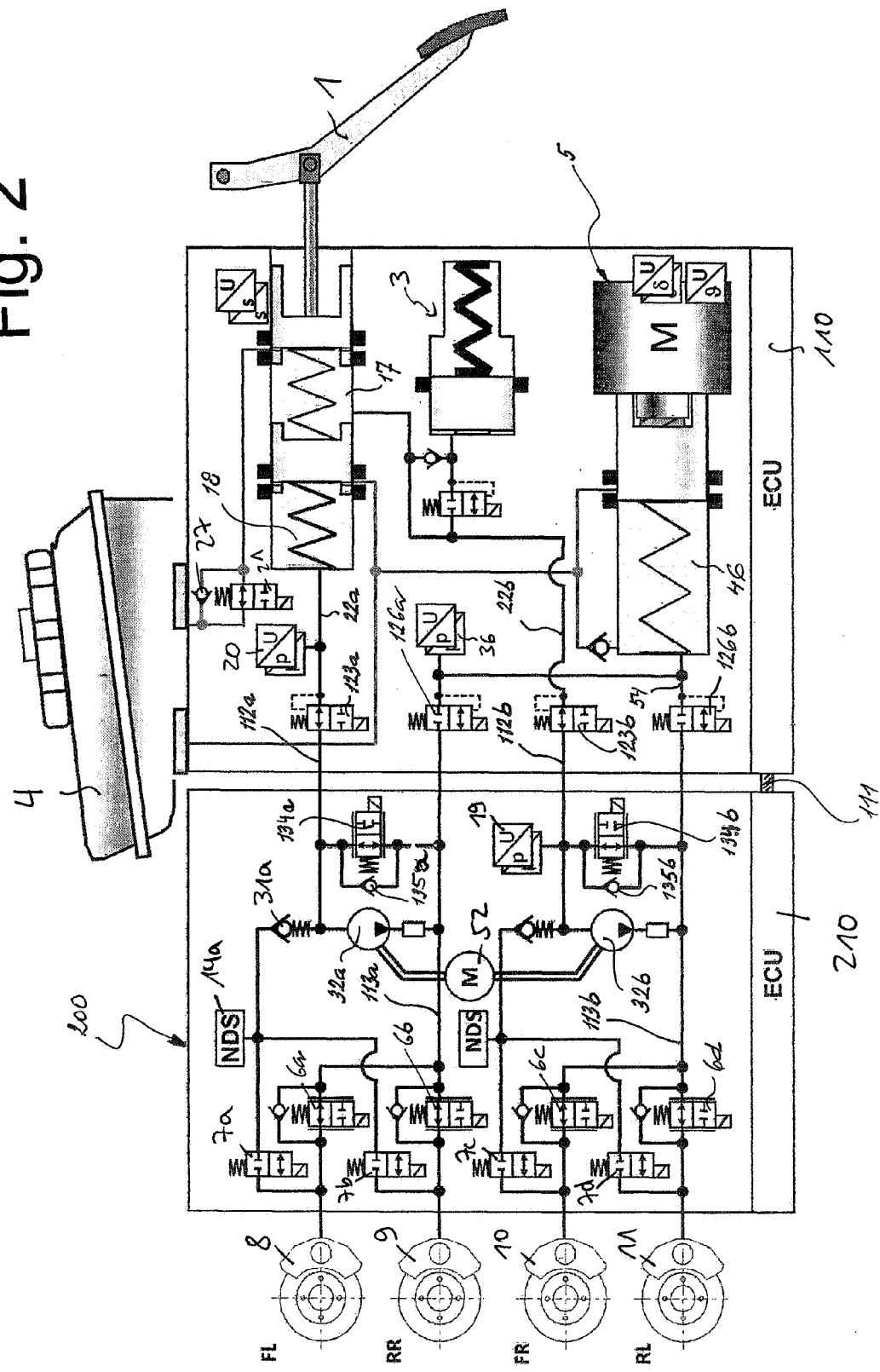
FIG. 2 shows a hydraulic circuit diagram of the second exemplary embodiment thereof.

In FIG. 2, in contrast to FIG. 1, the aforementioned sequence valves 126a, 126b are connected on one side to the system pressure line 54 and on the other directly to the modulator admission pressure lines 113a, 113b, while the brake circuit pressure lines 112a, 112b are connected directly to the suction-side connections of the pumps 32a, 32b. Consequently, the second embodiment of the brake system according to the invention shown in FIG. 2 comprises a total of four separate hydraulic connections between the first 200 and the second electrohydraulic module 100. In order to build up in the modulator admission pressure lines 113a, 113b pressures which are higher than the pressures which can be generated with the aid of the pumps 32a, 32b, which are higher than the brake circuit pressures and the system pressure, the isolation valves 123a, 123b remain open, whereby the pumps 32a, 32b are supplied with pressure medium from the master cylinder 2. Consequently, pressure medium supply valves are not required in the variant according to FIG. 2. In order to regulate the pressures in the modulator admission pressure lines 113a, 113b, with the pumps 32a, 32b delivering pressure medium, a respective parallel connection of a currentlessly open (normally open—NO) 2/2-way valve 134a, 134b, controllable by analog means, with a non-return (check) valve 135a, 135b opening to the modulator admission pressure lines 113a, 113b, is provided in each case between the modulator admission pressure lines 113a, 113b and the suction sides of the pumps 32a. Apart from the differing features enumerated, the electrohydraulic circuit represented in FIG. 2 corresponds to that in FIG. 1, like elements being denoted by the same reference symbols.

The operation of the brake system according to the invention, both in the preferred brake-by-wire operating mode and in the so-called fallback operating mode, will be apparent to the specialist working in the relevant technical field from the disclosure content of the present patent application and therefore does not require more detailed explanation.

While the above description constitutes the preferred embodiment of the present invention, it will be appreciated that the invention is susceptible to modification, variation, and change without departing from the proper scope and fair meaning of the accompanying claims.

The invention claimed is:
1. A brake system for motor vehicles which in a brake-by-wire operating mode can be activated both by a vehicle driver and independently of the vehicle driver, and which is normally operated in the brake-by-wire operating mode and can be operated in at least one fallback operating mode in which only operation by the vehicle driver is possible, comprising
a brake pedal for actuating a brake master cylinder having a housing and two pistons which are arranged one behind the other and define pressure chambers arranged in the housing, to which the pressure chambers two brake circuits connected with wheel brakes are connected, wherein an actuating force exerted by the brake pedal is exerted on the two pistons upon actuation of the brake system by the vehicle driver, and the pistons are positioned in a starting position by return springs when the brake pedal is not actuated,
a pressure medium reservoir for a pressure medium which is exposed to atmospheric pressure and has reservoir chambers associated with the pressure chambers,
a travel detection device which detects the actuation travel of the brake pedal or of at least one of the two pistons connected to the brake pedal,
a travel simulator having a simulator release valve, which travel simulator communicates a desired haptic brake pedal feel to the vehicle driver in the brake-by-wire operating mode, being connected hydraulically via the simulator release valve to one of the pressure chambers, the simulator release valve being closed in the fallback operating mode,
an electrically controllable pressure source which delivers a brake system pressure,
isolation valves for isolating the pressure chambers from the two brake circuits,
sequence valves for isolating the electronically controllable pressure source from the two brake circuits;
pumps which are driven by an electric motor and associated with the two brake circuits, together with low-pressure hydraulic accumulators,
an inlet valve and an outlet valve for each of the wheel brakes for setting wheel-individual brake pressures which are derived from modulator admission pressures associated with the brake circuits, the inlet valves transmitting the modulator admission pressure to the wheel brakes in an unactivated state and limiting or preventing a build-up of the wheel brake pressure in an activated state and the outlet valves preventing an outflow of the pressure medium from the wheel brakes into the low-pressure accumulator in an unactivated state and permit- ting and controlling the outflow in an activated state, the inlet valves being closed, so that a reduction of wheel brake pressure takes place, electrically operated, normally open pump outlet valves connected to outlet ports of the pumps, at least one electronic control and regulation unit, and a valve arrangement comprising at least the isolation valves, the pump outlet valves, and the sequence valves, which valve arrangement, in an unenergized state, establishes for each of the brake circuits a hydraulic connection via a connecting line from one of the pressure chambers of the brake master cylinder to a modulator admission pressure line and disconnects the hydraulic connection in an energized state, wherein the isolation valves are open in the unenergized state and closed in the energized state and the sequence valves are closed in the unenergized state and open in the energized state, the valve arrangement preventing the electrically controllable pressure source from being subjected to pressure from the pressure chambers both in the unenergized and in the energized state of the valve arrangement.

2. The brake system as claimed in claim 1, wherein the sequence valves, in an energized state thereof, connect the electrically controllable pressure source to the modulator admission pressure lines.

3. The brake system as claimed in claim 2 wherein the pumps, the low-pressure hydraulic accumulators, non-return valves, hydraulic damping elements, the inlet valves, and the outlet valves) are combined in a first module which is connected via the hydraulic connecting lines to a second module which supplies the first module with hydraulic pressure.

4. The brake system as claimed in claim 3, wherein the second module includes the brake master cylinder, the travel simulator, the electrically controllable pressure source, the isolation valves, the sequence valves, pressure sensors for detecting the pressure supplied by the brake master cylinder and the brake system pressure supplied by the electrically controllable pressure source, the travel detection device and the pressure medium reservoir.

5. The brake system as claimed in claim 3 wherein the first and the second module are each equipped with a respective separate electronic control and regulation unit which exchange data via a communication line.

6. The brake system as claimed in claim 5, wherein, within the second module, for each brake circuit, an outlet connection of the isolation valve and an outlet connection of the sequence valve are connected.

7. The brake system as claimed in claim 3 wherein within the first module the hydraulic connecting lines for the brake master cylinder are connected to corresponding connecting lines for the electrically controllable pressure source via a parallel connection of a normally open 2/2-way valve, which is controllable by analog means and a non-return valve which opens towards the inlet valves.

8. The brake system as claimed in claim 3 wherein in the second module a hydraulic pressure compensation line is provided between one of the pressure chambers of the brake master cylinder and a feed chamber of the pressure medium reservoir, the pressure compensation line having a parallel connection of an electrically actuable, normally open valve or a diagnostic valve and a non-return valve opening towards the brake master cylinder.

9. The brake system as claimed in claim 3 wherein the isolation valves block or open the hydraulic connecting lines between the second and the first hydraulic module, the hydraulic connecting lines being connected to suction sides of the hydraulic pumps in the first module.

10. The brake system as claimed in claim 3 wherein the hydraulic connecting lines are connectable to suction sides of the hydraulic pumps via a respective electromagnetically operated, normally closed valve.

11. The brake circuit as claimed in claim 3 wherein first hydraulic connections for transmitting the circuit brake pressures and second hydraulic connections for transmitting the modulator admission pressures are provided between the first and the second modules.

12. The brake system as claimed in claim 11, further comprising in that the second hydraulic connections for transmitting the modulator admission pressures between the first and the second modules are connectable within the second module via the sequence valves to a system pressure line connected to the pressure source.

13. The brake system as claimed in claim 11, further comprising in that the first hydraulic connections for transmitting the circuit brake pressures between the first and the second modules are connected within the first module, in the unenergized state of the valve arrangement, to the modulator admission pressure lines via a parallel connection of a normally open valve, controllable by analog means and a non-return valve which opens towards the inlet valves.

14. The brake system as claimed in claim 1 wherein outlet volume flows of the pumps are delivered directly to the modulator admission pressure lines via hydraulic damping elements.

15. The brake system as claimed in claim 1 wherein the electrically controllable pressure source is in the form of a single-circuit electrohydraulic actuator comprising an electric motor and a cylinder-piston arrangement connected operatively to an output of the electric motor, a piston of the cylinder-piston arrangement being driven via a transmission by the electric motor and at least one sensor which detects a state variable of the electric motor.

\* \* \* \* \*